Nov. 8, 1955  R. A. CHRISTIAN ET AL  2,723,019
MECHANISM TO CONTROL MOVEMENT OF TRAVELING CARRIAGES
Filed April 21, 1954

INVENTORS
RAYMOND A. CHRISTIAN
HERBERT C. JOHNSON &
ANTHONY W. TITUS

BY *Earl Beust*
*Richard Van Buram*

THEIR ATTORNEYS

United States Patent Office 2,723,019
Patented Nov. 8, 1955

2,723,019

MECHANISM TO CONTROL MOVEMENT OF TRAVELING CARRIAGES

Raymond A. Christian, Herbert C. Johnson, and Anthony W. Titus, Dayton, Ohio, assignors to The National Cash Register Company, Dayton, Ohio, a corporation of Maryland Application April 21, 1954, Serial No. 424,651

5 Claims. (Cl. 197—177)

This invention relates to accounting machines and the like and is particularly directed to mechanism for controlling the movement of the traveling carriages of such machines in forward and reverse tabulating directions.

Speaking in general terms, the principal object of the present invention is the provision of means to control the movement of the traveling carriages of accounting machines in forward and reverse tabulating directions under the control of a single manipulative member.

Another object is to provide means including a manipulative member for controlling the movement of the traveling carriage, said member being operable so as to cause the carriage to move in forward tabulating direction or, alternately, so as to cause said carriage to move in reverse tabulating direction.

A further object is the provision of means to selectively control the movement of a power-driven traveling carriage in either forward tabulating or reverse tabulating direction, said means including a manipulative member which, when operated in a certain manner, causes the traveling carriage to move in forward tabulating direction and, when operated in another manner, causes said traveling carriage to move in reverse tabulating direction.

With these and incidental objects in view, the invention includes certain novel features of construction and combinations of parts, a preferred form or embodiment of which is hereinafter described with reference to the drawing which accompanies and forms a part of this specification.

Description

The present invention is directed to improvements in the traveling carriage equipment of accounting machines and is particularly directed to means to selectively control the movement of a power-driven traveling carriage in either forward or reverse tabulating direction through the proper operation of a single manipulative member.

The machine embodying the present invention is of a well-known type, the details of which are fully disclosed in Letters Patent of the United States No. 2,626,749, granted January 27, 1953, to Raymond A. Christian et al., to which reference may be had for an explanation of mechanism which is not pertinent to the present invention and which for that reason will be described only in general terms herein.

Figure 1:
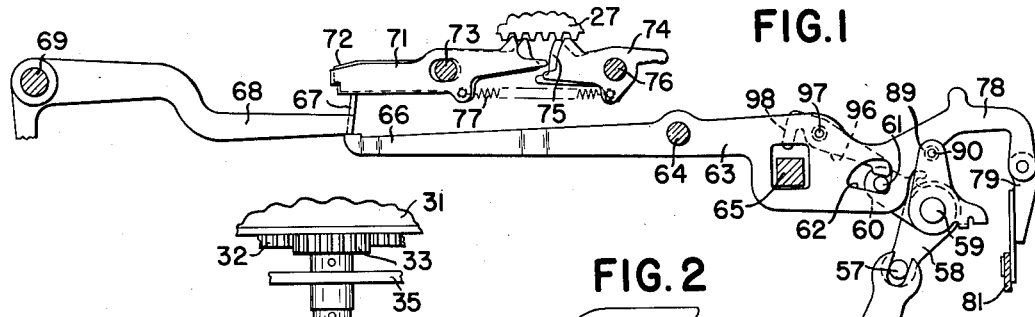
Fig. 1 is an elevation, as observed from the front of the machine, of the mechanisms for driving and controlling the movement of the traveling carriage in forward and reverse tabulating directions.
Figure 2:
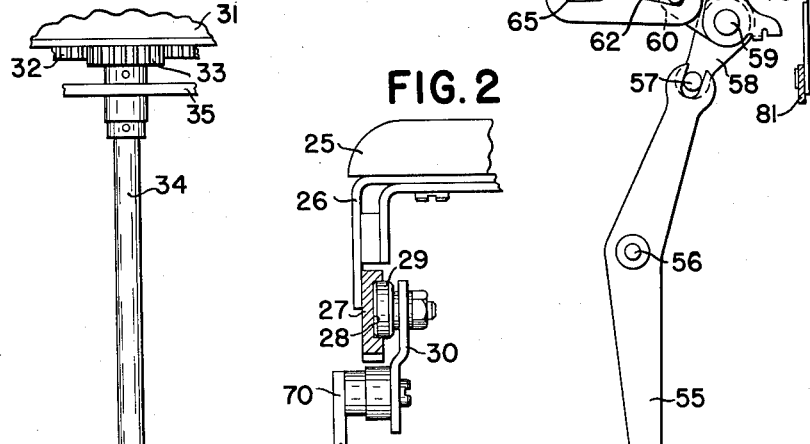
Fig. 2 is a detail view showing the manner in which the carriage escapement bar is connected to the carriage framework.

The machine embodying the present invention is provided with a traveling carriage including a framework 25, a fragmentary portion of which is shown in Figs. 1 and 2, said carriage being mounted for transverse shifting movement on the machine proper. The traveling carriage is power-driven either in a forward tabulating direction or in a reverse tabulating direction, the latter being often referred to as return direction, and a non-positive fluid clutch is provided for connecting the traveling carriage to its power driving means, said clutch being normally arranged to urge the carriage in a forward tabulating direction. A reversing mechanism is provided, which may be operated either manually or automatically to cause the fluid clutch to urge the carriage in a reverse tabulating direction whenever required.

Figure 3:
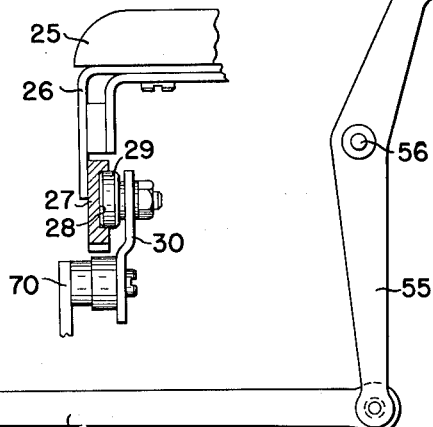
Fig. 3 is a detail view of the carriage escapement pawls in disengaged condition.

The longitudinally-shiftable carriage framework 25 (Figs. 2 and 3) has connected thereto two brackets 26 (only one shown here), having secured thereto an escapement bar 27, which extends substantially the full length of the traveling carriage. The rear surface of the escapement bar 27 has a channel 28 cut therein, which is engaged by a plurality of rollers 29, secured to the upper edge of a plate 30, secured by various studs and posts to a companion plate 70 in turn secured to the machine framework, said rollers, in cooperation with said channel 28, supporting the front portion of the traveling carriage 25 for horizontal shifting movement. The framework 25 supports near its rear edge a tubular rail (not shown), which, in cooperation with corresponding rollers (not shown) secured to the machine framework, assist the bar 27 and the rollers 29 in supporting the traveling carriage 25 for horizontal shifting movement. Also forming a part of the shiftable traveling carriage framework and extending substantially its full length is an angle bar 31 (Fig. 1), having secured to its lower bent-over edge a traveling-carriage-driving rack 32, the teeth of which are engaged by a driving gear 33, secured to the upper end of a vertical shaft 34, journaled in upper and lower plates 35 and 36, in turn secured, respectively, to the machine framework and to the housing for the fluid clutch mechanism.

Secured on the lower end of the shaft 34 is a wide-faced gear 37, which meshes with a shiftable gear 38 secured on a short vertical shaft 39 journaled in a bushing 40, secured in the plate 36, and in a bushing 41 secured in a bracket 42 in turn secured to the plate 36. Also secured on the shaft 39 is a coupling finger 43, arranged to be shifted into coacting relationship with a stud 44 fast to a gear 45 journaled on the bushing 40, and into coacting relationship with a similar stud 46 fast to a gear 47, rotatably mounted on the bushing 41. The gear 45 meshes with a gear 100 (Fig. 1) fast to a hub 101 rotatable on a vertical shaft 102 journaled in the fluid clutch housing, and having connected to its lower end the driving member (not shown) of a fluid clutch, the other end of said shaft 102 being connected to the operating motor (not shown) for the machine, said motor being of the continuously-running type. The hub 101 has a clutch cut engaged by tenons on the upper end of a sleeve 103 free on the shaft 102 and having secured on its lower end a clutch driven member (not shown). The two clutch members are immersed in a suitable clutch fluid to form a non-positive connection therebetween, whereby operation of the driving member urges the driven member, the gear 100, and the gear 45 to rotate in unison therewith to shift the traveling carriage in a forward tabulating direction or toward the left as observed from the front of the machine (Fig. 1). An idler gear device (not shown), connected between the gear 100 and the gear 47, urges said gear 47 to rotate in a reverse direction to the gear 45 to in turn shift the traveling carriage in a reverse tabulating direction or toward the right as viewed from the front of the machine.

It is believed unnecessary to explain the hydraulic or fluid clutch mechanism further herein; however, if a complete disclosure of this mechanism is desirable, reference may be had to the United States Patent No. 2,626,749, referred to at the beginning of this specification.

A shifting collar 48 (Fig. 1) is adjustably secured on the upper end of the shaft 39 by means of two similar nuts 49, which are threaded on the upper end of said shaft. A groove in the shifting collar 48 is engaged by axially-alined shifting pins 50 secured in similar arms 51 in turn secured on a shaft 52 journaled in a bracket secured to the machine base, said bracket and said base not being shown herein. Also secured on the shaft 52 is a crank 53 having pivotally connected thereto one end of a link 54, the other end of which is pivotally connected to the downward end of a lever 55, in turn rotatably mounted on a stationary stud 56 secured in the machine framework. An upward extension of the lever 55 has a slot which engages a stud 57 in an arm 58 secured on a shaft 59 journaled in the machine framework. Also secured on the shaft 59 is an arm 60 having a stud 61, which extends through an opening 62 in a lever 63 pivotally mounted on a stud 64 secured in the plate 70. A left-hand extension 66 of the lever 63 underlies and coacts with an ear 67, bent inwardly from the right-hand arm of a lever 68 free on a stud 69 secured between the plates 30 and 70.

The ear 67 of the lever 68 (Figs. 1 and 3) underlies and coacts with left-hand extensions of escapement pawls 71 and 72 having similar slots, which engage a stud 73 secured in the plate 30, to mount said escapement pawls for pivotal and slight shifting movement. The escapement pawls 71 and 72 have, on right-hand extensions thereof, upwardly-formed teeth which cooperate with rack teeth formed on the lower edge of the escapement bar 27, to control letter-spacing movement and forward tabulating movement of said tabulating carriage. The escapement pawls have associated therewith corresponding anti-rebound pawls 74 and 75 free on a stud 76 secured in the plate 30, each of said anti-rebound pawls having an upwardly-formed tooth which cooperates with the teeth on the lower edge of the escapement bar 27, to eliminate excessive rebounding of the traveling carriage when it is tabulated forwardly from one columnar position to another and to control reverse tabulating movement of said traveling carriage. Springs 77, tensioned between the corresponding escapement and rebound pawls, urge said pawls counter-clockwise and clockwise, respectively, to maintain their teeth in yielding engagement with the teeth on the escapement bar 27.

Figure 4:
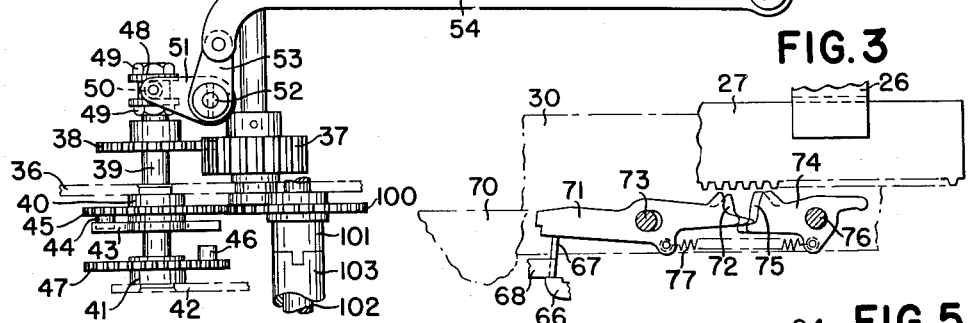
Fig. 4 is a detail view of the key lever for controlling the movement of the traveling carriage in forward and reverse tabulating directions.

A right-hand extension 78 of the lever 63 (Fig. 1) is pivotally connected to the upper end of a short link 79, a bent-over downward portion of which (Fig. 4) has a slot which engages a stud 80 secured in a key lever 81 pivoted on a stud 82 secured in the main right frame (not shown) of the machine. The left-hand end of the lever 81 is provided with a finger piece 83 for the convenient manipulation of said lever. A spring 84, tensioned between a stud in the key lever 81 and a stop stud 85 secured in the right main frame, urges said key lever upwardly or clockwise to normally maintain an undercut portion thereof in contact with the stop stud 85. Depression of the key lever 81 is limited by means of a downward projection 86 thereon, in cooperation with a stop stud 87 secured in the right main frame.

Figure 5:
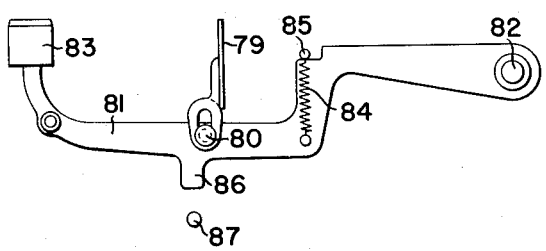
Fig. 5 is a detail view of the mechanism for restoring the carriage-driving mechanism to normal or forward tabulating condition.

Secured on the shaft 59 (Figs. 1 and 5) is an arm 89 carrying a stud 90, which engages a slot in a reversing lever 91 shiftably supported on the plate 70, said lever carrying a stud 92, upon which is pivoted a spring arm 93. The arm 93 is urged counter-clockwise by a comparatively strong spring 94, tensioned between said arm and a stationary stud 95, to cause a downward finger of said arm 93 to yieldingly engage the stud 90 and retain said stud in the open slot in the lever 91. The regular carriage reverse tabulating or return mechanism operates the lever 91 in the manner explained in the United States Patent No. 2,626,749, to rock the arm 89, the shaft 59, and the arm 58 counter-clockwise. This in turn rocks the lever 55 clockwise, which, through the link 54, imparts counter-clockwise movement to the crank 53, the shaft 52, and the arms 51, to cause the pins 50, in cooperation with the collar 48, to shift said collar, the shaft 39, the gear 38, and the clutch finger 43 downwardly, to disengage said finger from the stud 44 and to engage it with the stud 46 in the gear 47 to cause the traveling carriage to be driven in a reverse tabulating direction, through the medium of said gear 47, clutch finger 43, gear 38, gear 37, shaft 34, gear 33, and rack 32 (Fig. 1).

When the traveling carriage reaches the selected columnar position while traveling in a reverse tabulating direction, the lever 91 is restored to its normal position, which, through the spring finger 93, carries the arm 89 and connected mechanism in unison therewith, to restore the clutch finger 43 upwardly into the path of the stud 44 in the gear 45, so that the traveling carriage will normally be urged to move in a forward tabulating direction.

The key lever 81 (Fig. 4) has two stages of operation or depression, the first of which releases the escapement mechanism and thus frees the traveling carriage to the action of the fluid clutch, which is, as explained above, normally operating to drive the traveling carriage in a forward tabulating direction. The second stage of depression of the key lever 81, which requires the exertion of a noticeable amount of pressure in relation to the first stage of movement, in addition to freeing the escapement mechanism, also operates the reversing mechanism to cause the traveling carriage to be moved in a reverse tabulating direction.

The arm 60 (Fig. 1), which, as previously explained, is secured on the shaft 59, carries the stud 61, which extends through the opening 62 in the lever 63, said stud 61 constructed and arranged to coact with a right-hand extension of a reversing lever 96 fulcrumed on a stud 97 carried by the lever 63. Initial or first stage of operating movement of the finger lever 81, through the link 79, rocks the lever 63 clockwise, causing said lever in turn to rock the companion lever 68 counter-clockwise, whereupon the ear 67 engages the left-hand extensions of the escapement pawls 71 and 72 (Figs. 1 and 3) and rocks said pawls clockwise to disengage their teeth from the teeth of the escapement bar 27. Right-hand extensions of the pawls 71 and 72, in cooperation with corresponding left-hand extensions on the retaining or anti-rebound pawls 74 and 75, simultaneously rock said pawls counter-clockwise to disengage their teeth from the teeth of the escapement bar 27, to free said bar and the traveling carriage for movement. Clockwise movement of the lever 63, as explained above, causes the reversing lever 96, in cooperation with the stud 61, to move relatively thereto, or counter-clockwise, until a downward extension 98 of said lever contacts the top surface of a square stud 65, which extends through a clearance opening in the lever 63 and is secured in the plate 70. The contacting of the extension 98 of the lever 96 with the stud 95 terminates the initial or first stage of movement of the key lever 81 and the lever 63, and in this case the clutch finger 43 (Fig. 1) remains in the path of the stud 44 and drives the traveling carriage in a forward tabulating direction. Releasing pressure on the key lever 81 permits the spring 84 to return said lever and connected parts to normal position to cause the escapement pawls to again engage the teeth of the bar 27 to terminate forward tabulating movement of the traveling carriage. If it is desired to have the traveling carriage move in a reverse tabulating or return direction, additional pressure is imparted to the finger lever 81 (Figs. 1 and 4) after it has completed its first stage of movement, and this causes the extension 98, in cooperation with the stud 65, to rock the lever 96 clockwise, in relation to the lever 63, which, through the stud 61, rocks the arm 60, the shaft 59, the arm 58, and the arm 89 (Fig. 5) counter-clockwise, against the action of the spring arm 93 and the spring 94. Counter-clockwise movement of the arm 58, through the lever 55 and the link 54, rocks the crank 53, the shaft 52, and the arms 51 counter-clockwise, to shift the clutch finger 43 downwardly, in the manner explained before, to move said finger into the path of the driving stud 46 in the gear 47, so that said gear will drive the traveling carriage in a reverse tabulating direction when a full extent of manual movement is imparted to the key lever 81. Releasing pressure on the key lever 81 permits the spring 84 to restore said key lever upwardly to normal position, and simultaneously the spring 94 and the spring arm 93 restore the shaft 59 and connected parts to normal position, as shown in Fig. 1, in which the finger 43 is again in the path of the stud 44, which, as previously explained, drives the traveling carriage in a forward tabulating direction.

There is a noticeable difference of pressure required to operate the key lever 81 through its two stages of movement, so that the operator may readily and easily determine when the first stage of movement has been completed. In either of its stages of movement, the finger lever 81 must be retained depressed as long as it is desired to have the traveling carriage move in either a forward or a reverse tabulating direction, because, the instant pressure on the key lever 81 is released, the escapement and retaining pawls become effective to terminate movement of the carriage, regardless of the direction in which it is moving. As a rule, the key lever 81 is employed to cause the traveling carriage to move to its extreme position in either a forward or a reverse tabulating direction, which positions are determined by the usual margin stops located at opposite ends of said traveling carriage, and therefore said key lever would not ordinarily be used to cause the traveling carriage to tabulate to intermediate columnar positions.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope and spirit of the invention.

What is claimed is:

1. In a machine of the class described, having a horizontally-shiftable traveling carriage, continuously-operating power means to shift the traveling carriage, and a non-positive fluid clutch to connect the power means to the traveling carriage, the combination of reversible means to connect the fluid clutch to the traveling carriage, said means normally effective to cause the traveling carriage to be shifted in a forward tabulating direction, but being reversible to cause said traveling carriage to be shifted in a reverse tabulating direction; means normally effective to retain the traveling carriage against shifting movement in either direction; a manipulative member having a partial and a full extent of operating movement; means operated by the manipulative member upon either extent of operating movement thereof to release the retaining means to free the traveling carriage for shifting movement in a forward tabulating direction; and means operated by the releasing means and effective upon operation of said releasing means by the manipulative member when given a full extent of operating movement to reverse the connecting means to cause the traveling carriage to be shifted in a reverse tabulating direction.

2. In a machine of the class described, having a horizontally-shiftable traveling carriage, continuously-operating power means to shift the traveling carriage, and a non-pisitive means to connect the power means to the traveling carriage, said means normally effective to cause the traveling carriage to be shifted in a forward tabulating direction, but being reversible to cause said traveling carriage to be shifted in a reverse tabulating direction, the combination of means normally effective to retain the traveling carriage against shifting movement in either direction; a manipulative member having a partial and a full extent of operating movement; means operatively connected to the manipulative member and effective upon operation of said member to release the retaining means to free the traveling carriage for shifting movement in forward tabulating direction as long as said member is retained in partially-operated condition; and means on the releasing means and effective upon operation of said releasing means by the manipulative member when given a full extent of operating movement to reverse the connecting means to cause the traveling carriage to be shifted in reverse tabulating direction as long as said manipulative member is retained in full operated condition.

3. In a machine of the class described, having a horizontally-shiftable traveling carriage and non-positive power means, normally effective to drive said traveling carriage in a forward tabulating direction, said power means being reversible to drive said traveling carriage in a reverse tabulating direction, the combination of means normally effective to retain the carriage against movement in either direction; a manipulative member having a partial and a full degree of operating movement; means including a lever operated by the member during either of its degrees of movement to release the retaining means to free the traveling carriage for movement, which is normally in a forward tabulating direction; and means actuated by the lever when it is operated by a full degree of movement of the manipulative member to reverse the operation of the non-positive power means to cause the traveling carriage to move in a reverse tabulating direction.

4. In a machine of the class described, having a horizontally-shiftable traveling carriage and non-positive power means to drive the traveling carriage, the combination of means operated by the non-positive power means to shift the traveling carriage in forward or reverse tabulating directions; connecting means operable to selectively connect the traveling carriage to the shifting means, said connecting means normally effective to cause the shifting means to shift said traveling carriage in a forward tabulating direction; means normally effective to retain the traveling carriage against shifting movement; a manipulative member having a partial and a full extent of operating movement; means including a lever operable by the member during either of its extents of movement to release the retaining means to free the traveling carriage for shifting movement; and means including a mechanical advantage device mounted on the lever and operable thereby upon a full extent of movement of the manipulative member to operate the connecting means to cause the shifting means to shift the traveling carriage in a reverse tabulating direction.

5. In a machine of the class described, having a horizontally-shiftable traveling carriage and non-positive power means to drive the traveling carriage, the combination of means operated by the non-positive power means to shift the traveling carriage in forward tabulating direction; means operated by the non-positive power means to shift the traveling carriage in reverse tabulating direction; means normally effective to connect the traveling carriage to the first shifting means to cause said traveling carriage to be shifted in a forward tabulating direction, said connecting means operable to disconnect the traveling carriage from the first shifting means and to connect it to the second shifting means to cause said traveling carriage to be shifted in a reverse tabulating direction; means normally effective to retain the traveling carriage against shifting movement in either direction; a manipulative member having a partial and a full extent of operating movement; means including a lever operable by the member during either extent of its operating movement to release the retaining means to free the traveling carriage for shifting movement, which movement is normally in a forward tabulating direction; and means including a movement-amplifying element mounted on the lever and operable thereby upon a full extent of operation of the member to operate the connecting means to disconnect the traveling carriage from the first shifting means and to connect it to the second shifting means to cause said traveling carriage to be shifted in a reverse tabulating direction.

References Cited in the file of this patent

UNITED STATES PATENTS 2,635,732     Butler _____ Apr. 21, 1953